(12) United States Patent
Chen

(10) Patent No.: US 6,369,690 B1
(45) Date of Patent: *Apr. 9, 2002

(54) POTENTIOMETER

(76) Inventor: Jack Chen, 14 Kimberly Cir., Oak Brook, IL (US) 60521

( * ) Notice: Subject to any disclaimer, the term of this patent is extended or adjusted under 35 U.S.C. 154(b) by 0 days.

This patent is subject to a terminal disclaimer.

(21) Appl. No.: 09/519,492

(22) Filed: Mar. 6, 2000

(51) Int. Cl.[7] ............................................... H01L 10/30
(52) U.S. Cl. ...................... 338/160; 338/307; 338/190; 338/33; 338/162
(58) Field of Search ................................ 338/307, 118, 338/160, 162, 185, 190, 33

(56) References Cited

U.S. PATENT DOCUMENTS

| 2,688,679 A | * | 9/1954 | Schleuning | 338/190 |
|---|---|---|---|---|
| 3,723,938 A | * | 3/1973 | Gramm | 338/162 |
| 4,134,096 A | * | 1/1979 | Denes | 338/195 |
| 4,318,075 A | * | 3/1982 | Pudelko et al. | 338/162 |
| 4,931,764 A | * | 6/1990 | Gaston | 338/185 |
| 5,119,063 A | * | 6/1992 | Nonnenmacher et al. | 338/159 |
| 5,243,318 A | * | 9/1993 | Greenstein | 338/195 |
| 5,554,965 A | * | 9/1996 | Sundberg | 338/160 |
| 6,025,772 A | * | 2/2000 | Chen | 338/160 |

\* cited by examiner

*Primary Examiner*—Karl D. Easthom
(74) *Attorney, Agent, or Firm*—Robert L. Marsh

(57) ABSTRACT

A resistor card for a potentiometer to measure the fuel in a fuel tank consists of a non-conductive substrate with a plurality of elongate conductive contacts deposited thereon. The contacts have an elevation above the surface of the substrate and the contacts are oriented in parallel relationship to each other to form a wiper track across which a wiper is moveable. To reduce the rate at which the upper surfaces of the contacts are worn away by movement of the wiper, an insulating or highly resistive filler material is deposited between the conductive materials which form the lands.

4 Claims, 3 Drawing Sheets

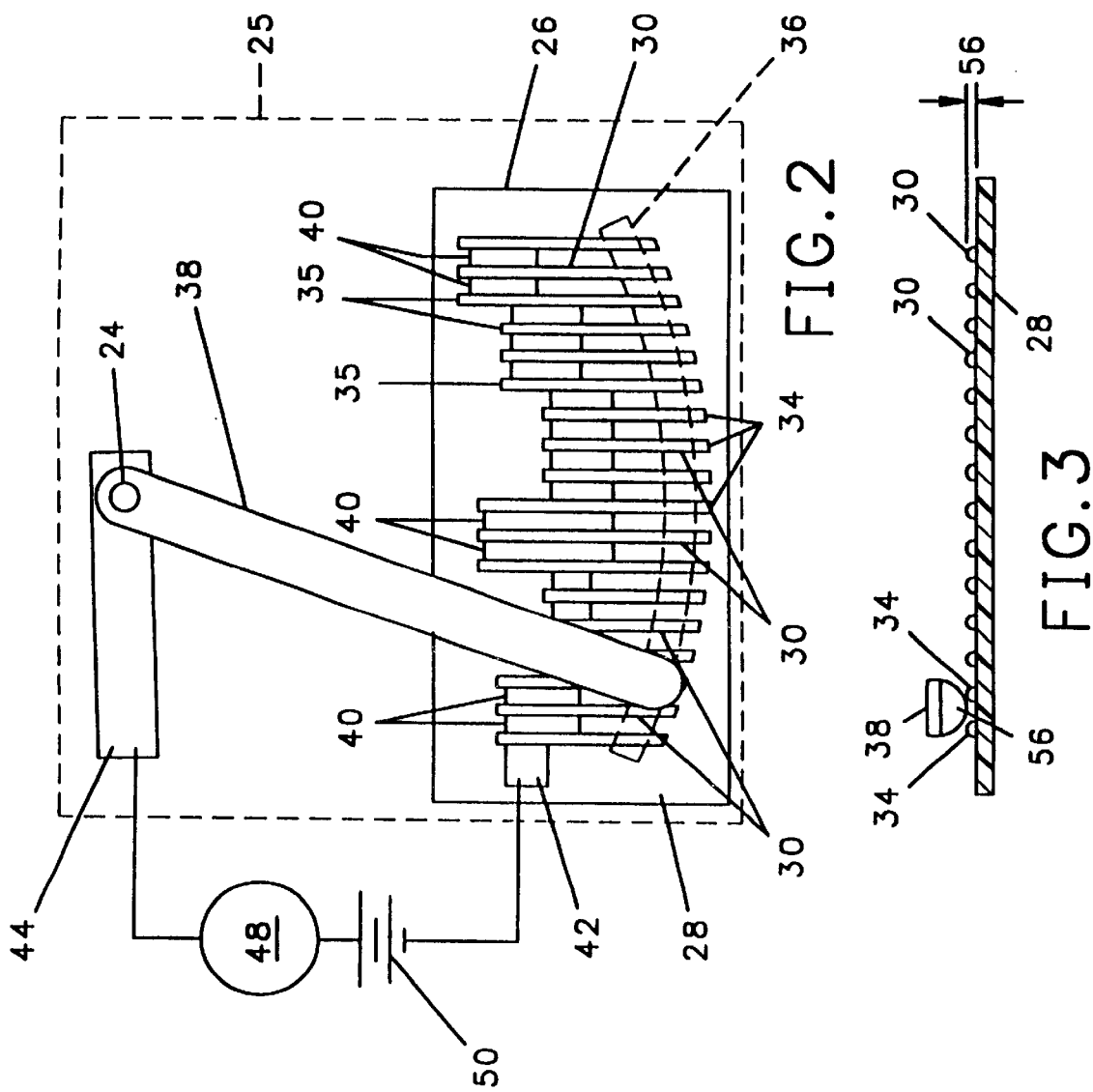

POTENTIOMETER

The present invention relates to potentiometers of the type used in fuel gauges for measuring the amount of fuel in a fuel tank of a vehicle and in particular to improved potentiometer.

BACKGROUND OF THE INVENTION

A variable resistor card having a card terminal, a plurality of contacts with resistors between the contacts, and a wiper track is part of a fuel sensor for a motor vehicle. Associated with the card is a wiper which is movable along the contacts of the wiper track and is connected to a float which moves horizontally in response to changes in the level of the fuel within the tank. The resistor is configured such that a change in the volume of fuel within the tank is proportional to the change in current passing through the resistor. The resistor is connected by a battery to an ammeter on the dashboard which serves as a fuel gauge.

Existing variable resistor cards employed in fuel gauges of vehicles have a non-conductive substrate upon which are deposited a plurality of elongate conductive lands each of which has a contact end and a resistor end. The lands are oriented to be generally parallel to each other with resistors positioned between the resistor ends of the lands and the contact ends are configured to form the wiper track across which the wiper is movable. The lands are formed by the deposition of conductive material upon the non-conductive substrate of the resistor card, and the lands have a thickness such that when seen in cross-section the lands stand as humps above the surface of the non-conductive substrate of the resistor card. As the wiper moves along the wiper track at the contact ends, the wiper moves across the humps of the lands and across the valleys between the lands. Over a long period of time, typically several years, movement of the wiper across the wiper track will cause the conductive material of the lands to be worn away. The wearing of the material of the lands will eventually cause the failure of the potentiometer and require replacement of the resistor card. It would be helpful to provide a resistor card which would have an extended life, that is, a resistor card having conductive lands which would not become worn away as a result of repetitious movement of the wiper across the wiper track.

SUMMARY OF THE INVENTION

Briefly, the present invention is embodied in a potentiometer having an improved resistor card. The resistor card has generally planar conductive substrate upon which are deposited a plurality of elongate conductive lands oriented to be generally parallel to each other, each of the lands having a resistor end and a contact end. Each pair of resistor ends have a resistor between them, the resistance of which is proportional to the change of volume of fuel in the tank which corresponding to the movement of the wiper between the adjacent contact ends of the lands.

Each of the lands has a thickness with an upper surface which is raised a given elevation above the surface of the substrate. In accordance with the present invention, a substantially planar surface across which the wiper is movable. The filler consists of either an insulating material or a relatively high resistance resistive material. In the preferred embodiment, the filler has have properties which will cause it to wear at a rate which is equal to the rate at which the conductive material of the lands is worn such that the wiper track remains substantially planar during the useful life of the resistor card. The lands of a resistor card in accordance with the present invention can be made thicker than the lands of prior art resistor cards and, therefore, the resistor card of the present invention will have an extended life.

BRIEF DESCRIPTION OF THE DRAWINGS

A better understanding of the present invention will be had after a reading of the following detailed description taken in conjunction with the following drawings wherein:

FIG. 2 is a front elevational view of a prior art fuel card used in conjunction with a wiper and fuel gauge in the fuel sensing device shown in FIG. 1;

FIG. 3 is a cross-sectional view of the fuel sensor card shown in FIG. 2 taken through line 3—3 thereof;

DETAILED DESCRIPTION OF A PREFERRED EMBODIMENT

Figure 1:
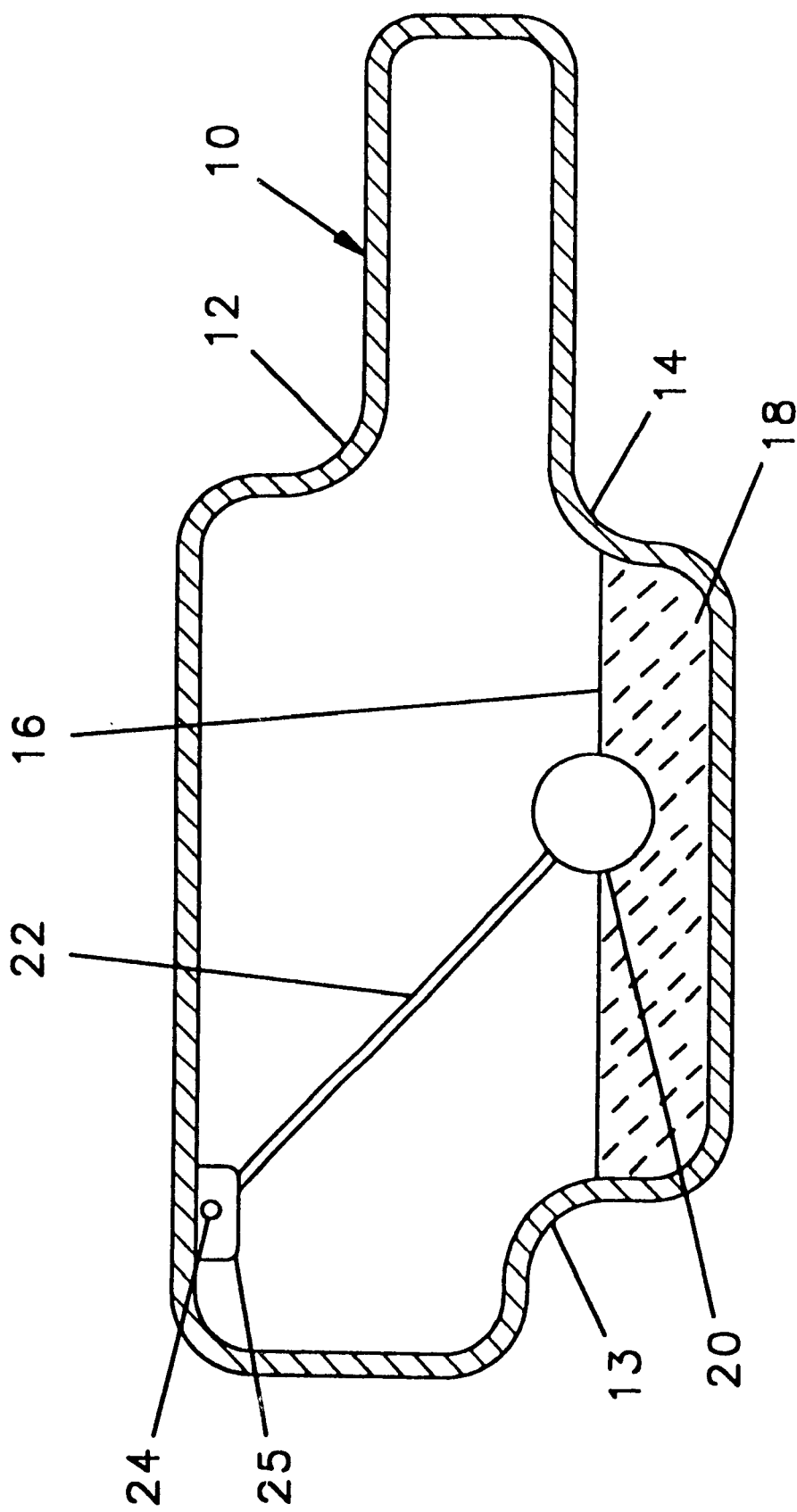
FIG. 1 is a cross-sectional view of a fuel sensing device in the fuel tank of a vehicle.

Referring to FIG. 1, a fuel tank 10 of a vehicle is irregularly shaped to fit within the confines of the space available in a vehicle and has a plurality of indentations 12, 13 and 14 therein. The volume of liquid in a tank is not proportional to the depth of the surface level 16 of the liquid fuel 18 therein because of the irregular shape of the tank 10. The fuel in the tank is measured by movement of a float 20 mounted on a rod 22 which is moveable about a pin 24.

Referring to FIGS. 1, 2, and 3, mounted within the tank 10 around the pivot pin 24 is a variable resistor 25 which includes a fuel sensor resistor card 26. The resistor card 26 consists of a planar non-conductive substrate 28 upon which are deposited a plurality of elongate conductive lands 30-30 each having a contact end 34 and a resistor end 35. As can be seen in FIG. 2, the lands 30-30 are oriented such that the contact ends 34 define a wiper track 36 across which the distal end of a wiper 38 can move and successively contact the contact ends 34 of the lands 30-30. In the embodiment shown, the contact ends are configured into an arc which is a segment of a circle with the pin 24 positioned at the center thereof. In this embodiment, the wiper 38 is pivotally attached by the pin 24 to the rod 22 such that movement of the float 20 will cause movement to the wiper 38 along the wiper track 36. It should be appreciated that the wiper 38 could be in the form of a slide moveable by a float such that the wiper track 36 would be linear rather than arcuate as shown.

As best shown in FIG. 2, the contact ends 34-34 of the lands 30-30 are spaced from one another and between each pair of resistor ends 35-35 is a resistor 40-40. In the preferred embodiment, a given resistor 40 has a resistance which is proportional to the change in volume of liquid within the tank which occurs when the float 20 causes the wiper 38 to move from the contact 30 on one side of the given resistor 40 the other contact 30 on the opposite side thereof. Since the volume of liquid in the tank 10 is not proportional to the depth of the liquid 18 therein the resistors 40-40 are not necessarily equal to each other, but rather vary with the non-linear relationship between the volume of liquid in the tank, and the surface levels 16 thereof.

The resistor card 26 has a terminal 42 and the wiper 38 has a terminal 44, and the card 26 and wiper 38 combine to form a potentiometer which is connected in series with an ammeter 48 and battery 50. The ammeter 48 is positioned on the dashboard of the vehicle and is the fuel gauge for the vehicle. Referring to FIG. 3, in accordance with the prior art the conductive lands 30-30 are deposits of conductive material on the surface of the substrate 28 such that each of the lands 30-30 has an upper surface elevated a distance 54 above the surface of the substrate 28. As the wiper 38 moves across the wiper track 36, the distal end 56 of the wiper 38 moves across the upper surfaces of successive contact lands 30-30. Over a period of several years, the conductive material of the lands 30-30 may be worn away by movement of the distal end 56 across the upper surface 54 thereof and ultimately cause the failure of the potentiometer.

Figure 4:
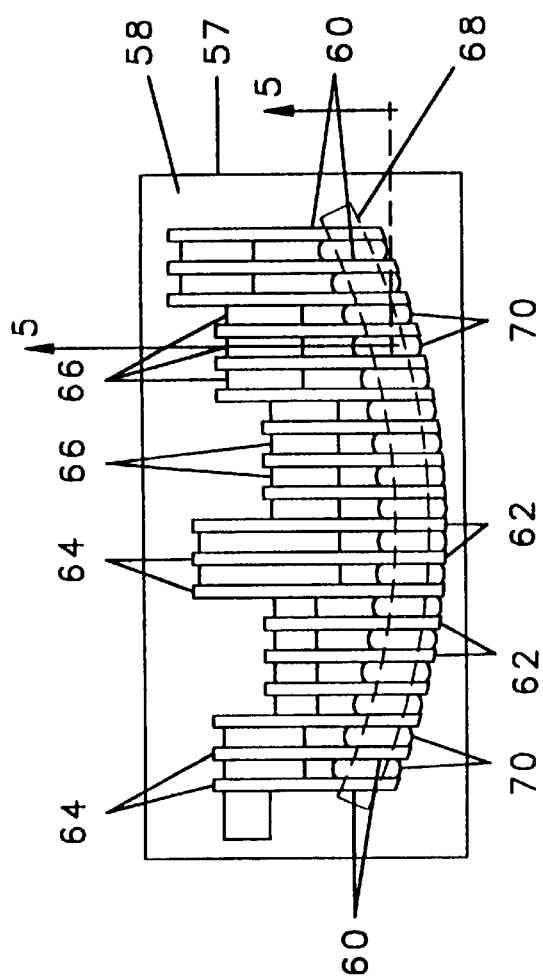
FIG. 4 is a front elevational view of a fuel sensor card in accordance with the present invention.
Figure 5:
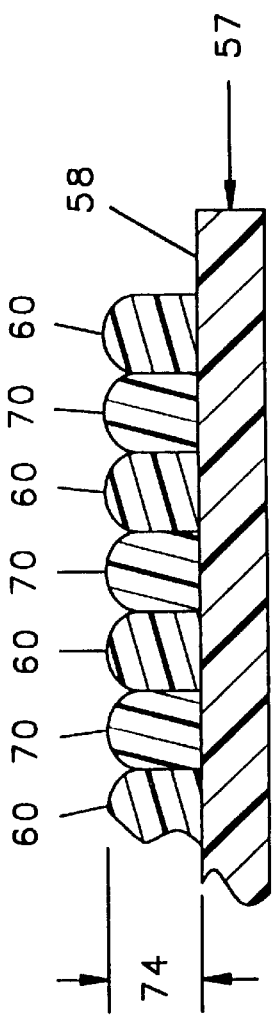
FIG. 5 is an enlarged fragmentary cross-sectional view of the fuel sensor card shown in FIG. 4 taken through line 5—5 thereof.

Referring to FIGS. 4 and 5, a resistor card 57 in accordance with the present invention has a substrate 58 upon which are deposited a plurality of elongate conductive lands 60-60. The conductive lands have contact ends 62-62 and resistor ends 64-64. Between adjacent resistor ends 64-64 of the lands are resistors 66-66 and the contact ends 62-62 define a wiper track 68, all of which are similar to resistor card 26 of the prior art.

As best shown in FIG. 5, unlike the resistor card 26 of the prior art, between the contact end 62-62 of the lands 60-60 are deposits 70-70 of an insulating material or a highly resistive resistance material. In accordance with the invention the upper surfaces of the deposit 70-70 are substantially coplanar with the upper surfaces of the lands 60-60. In the preferred embodiment, the filler deposits 70-70 have a resistance to wear which is substantially equal to that of the conductive material of which the lands 60-60 are comprised such that the material of the lands 60-60 and the material of the deposits 70-70 will wear at a substantially equal rate as a result of the movement of the distal end 56 of the wiper 38 along the surfaces thereof. Since the wiper track 68 of resistor card 57 has a generally planar upper surface, the thickness 74 of the conductive and filler deposits which make up the lands 60-60 and the fillers 70-70 may be thicker than the thickness 54 of the land deposits 30-30 of the prior art resistor card 26. Furthermore, since the upper surfaces of the lands 60-60 and the filler 70-70 form a substantially planar surface, the lands 60-60 present less resistance to the movement of the wipers than did the lands of the prior art, and therefore, the rate at which the materials thereof are worn away will be correspondingly slower. The resistor card 57 in accordance with the present invention, therefore, will have a longer usable life than the resistor card 26 of the prior art.

The resistors 40 of a resistor card 57 used in the fuel gauges of an automobile are trimmed with a laser so that the resistance of each resistor 40 falls within fixed specifications in order that the potentiometer accurately measures the changes in volume of liquid within the tank. In some cases, the specifications of a given resistor 40 may require that the resistance fall within very narrow range. Tolerances may be as narrow as plus or minus 1%.

The filler material 70 may be either an insulating material or a high resistance resistive material. If resistive material is used, the resistance of the filler must be high enough that its presence will not significantly change the overall resistance of any resistor 40 between successive lands 30-30. For the purposes of definition, a change in the overall resistance of a resistor is significant if it causes the overall resistance to fall outside of the specifications for the resistor 40.

A resistor card 57 having conductive lands 60-60 and filler 70-70 thereon may be formed using a screen printing process whereby a conductor ink is deposited to form the lands 60-60 and another ink is deposited to form the filler 70-70. Alternatively, a vapor deposit method may be used to form the lands 60-60 and fillers 70-70.

While the present invention is described with respect to a single embodiment, it will be appreciated by those familiar with the art that many modifications and variations may be made without departing from the spirit and scope of the invention. It is the intent of the appended claims, therefore to cover all such variations and modifications which fall within the true spirit and scope of the invention.

What is claimed is:

1. A variable resistor card for use with a wiper to form a potentiometer, said resistor card comprising, a non-conductive substrate, a plurality of conductive lands in spaced relationship on a surface of said substrate, each of said contact lands having a resistor end and a contact end and a height above said substrate, said contact ends oriented to form a wiper track, a resistor between each successive pairs of said resistor ends of said conductive lands, a filler between said contact ends along said wiper track, said filler not extending over an upper surface of said contact ends wherein said filler and said conductive lands are alternately engagable by said wiper as said wiper moves along said wiper track, and said filler being one of an insulating material and a highly resistive resistance material.

2. A variable resistor card in accordance with claim 1 wherein said contact lands are made from a substance having a given endurance to wear as a result of movement of a wiper across the upper surface thereof, and said filler material has a given endurance to wear as a result of movement of a wiper across the upper surface thereof, and said given endurance to wear to said filler material is substantially equal to said given endurance to wear of said conductive material.

3. A potentiometer comprising, a wiper, and a resistor card, said resistor card having a non-conductive substrate, a plurality of conductive lands in spaced relationship extending along a surface of said substrate, each of said lands having a contact portion and a resistor portion, a resistor between successive pairs of resistor portions of said contact lands, said contact portions of said lands oriented to form a wiper track for said wiper, a filler between said contact portions of said lands along said wiper track, wherein said filler and said conductive lands are alternately contacted by said wiper during movement of said wiper across said wiper track, and said filler being one of an insulating material or a highly resistive resistance material.

4. A variable resistor card for use with a wiper to form a potentiometer, said resistor card comprising, a non-conductive substrate, a plurality of conductive lands in spaced relationship on said substrate, each of said contact lands having a resistor end and a contact end and a height above said substrate, said contact ends oriented to form a wiper track, a resistor between each successive pairs of said resistor ends of said conductive lands, a filler between said contact ends along said wiper track, wherein said filler and said conductive lands are alternately engagable by said wiper as said wiper moves along said wiper track, said filler being one of an insulating material and a highly resistive resistance material, and said filler between said contact ends having a height equal to said height of said contact lands.

* * * * *